A. E. HEATH.
SPARKING PLUG FOR IGNITION PURPOSES.
APPLICATION FILED OCT. 24, 1919.
1,349,454. Patented Aug. 10, 1920.
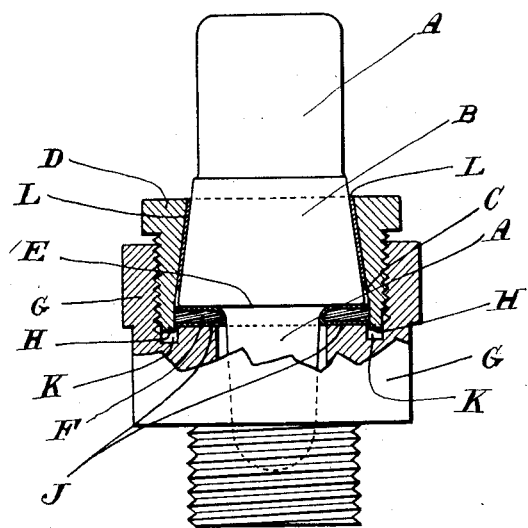

UNITED STATES PATENT OFFICE.

ARTHUR ERNEST HEATH, OF LONDON, ENGLAND.

SPARKING-PLUG FOR IGNITION PURPOSES.

1,349,454.  Specification of Letters Patent.  Patented Aug. 10, 1920.

Application filed October 24, 1919. Serial No. 332,945.

*To all whom it may concern:*

Be it known that ARTHUR ERNEST HEATH, a subject of the King of Great Britain, residing at London, England, have invented certain new and useful Improvements in Sparking-Plugs for Ignition Purposes, of which the following is a specification.

This invention relates to that class of sparking plug for ignition purposes having the insulator held in the gland nut and the gland nut having a coned interior engaging a coned shaped portion of the insulator, the insulator in some cases being provided with an outwardly extending flange at its larger part for receiving a washer and against which the gland nut after insertion into the plug casing is pressed, the flange being held between such washer and a wall on the plug body.

My invention will be clearly understood from the following description aided by the annexed drawing which shows sufficient of a sparking plug in part sectional elevation to illustrate my invention.

I form the insulator A with a suitable tapered portion B positioned in a suitable part of the insulator A to engage with a like taper C formed in the bore of the gland nut D, the smaller portion of the taper B being situated at the outer or upper end.

For the purpose of my invention the large or lower end of the taper portion B of the insulator A, I form as a shoulder E for the purpose of retaining the insulator A in the gland nut D by means of the packing washer F thus making a gas tight joint between the insulator A and the sparking plug body G.

I form an extension H at the end of the big bore of the gland nut D to carry the packing washer F, the extension H serving to hold the packing washer F, insulator A and gland nut D together. I form a shoulder J in the bore of the sparking plug body G which serves to tighten the packing washer F against the insulator A and gland nut when the two are screwed together.

To prevent the extension H of the gland nut D pressing on the shoulder J in the sparking plug body G, I form a groove K in the shoulder J opposite the end of the gland nut D which groove K leaves a projecting ring on the shoulder J which is slightly smaller in diameter than the bore of the extension H on the gland nut D and can pass up into the gland nut D to put sufficient pressure on the packing washer F and insulator A to make a gas tight joint and at the same time expands the washer F into the extension H to retain the insulator A and washer F in the gland nut D.

I may position in the bore C of the gland nut D a packing bush L made of soft metal or other suitable material to suit the taper on the insulator.

What I do claim as my invention, and desire to secure by Letters Patent is:—

In sparking plugs for ignition purposes of the class described, an insulator, a gland nut having a tapered bore for engaging the insulator and formed with an extension at the big end of the bore for holding a packing washer; said insulator having tapered outer sides and so formed that the taper portion of the insulator provides a shoulder, a packing washer, a spark plug body formed with a projecting ring of slightly smaller diameter than the bore of the gland nut on its internal shoulder for engaging with the packing washer situated between it and the shoulder on the insulator, substantially as and for the purpose set forth.

In testimony whereof I have hereunto set my hand in presence of two subscribing witnesses.

ARTHUR ERNEST HEATH.

Witnesses:
LYNWOOD F. GARDNER,
H. CORE GARDNER.